(12) United States Patent
Zajeski et al.

(10) Patent No.: US 9,203,946 B2
(45) Date of Patent: ***Dec. 1, 2015

(54) POWERED PORTABLE HANDLE REMOTE FOR SMARTPHONE

(71) Applicants: Robert Benedict Zajeski, Homer Glen, IL (US); Ben Lynch Zajeski, Plainfield, IL (US)

(72) Inventors: Robert Benedict Zajeski, Homer Glen, IL (US); Ben Lynch Zajeski, Plainfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,862

(22) Filed: Jul. 8, 2015

(65) Prior Publication Data

US 2015/0319285 A1 Nov. 5, 2015

Related U.S. Application Data

(63) Continuation of application No. 13/725,690, filed on Dec. 12, 2012, now Pat. No. 9,124,678.

(51) Int. Cl.

| H04M 1/04 | (2006.01) |
|---|---|
| H04M 1/725 | (2006.01) |
| H04M 1/02 | (2006.01) |
| G06F 3/0338 | (2013.01) |
| G09G 5/00 | (2006.01) |

(52) U.S. Cl.
CPC ......... *H04M 1/72544* (2013.01); *G06F 3/0338* (2013.01); *G09G 5/003* (2013.01); *H04M 1/0254* (2013.01); *H04M 1/7253* (2013.01); *G09G 2370/16* (2013.01)

(58) Field of Classification Search
CPC .. H04M 1/0254; H04M 1/7253; G06F 1/1632
USPC ................ 455/347, 352, 556.1, 557
See application file for complete search history.

(56) References Cited

U.S. PATENT DOCUMENTS

| 8,577,412 | B1 * | 11/2013 | Bishop | H04M 1/0281 439/660 |
|---|---|---|---|---|
| 8,837,156 | B2 * | 9/2014 | Sun | H02J 7/0044 320/114 |
| 2003/0148740 | A1 * | 8/2003 | Yau | H04M 1/04 455/575.1 |
| 2004/0246663 | A1 * | 12/2004 | Nuovo | H04M 1/0249 455/347 |
| 2006/0111076 | A1 * | 5/2006 | Davie | B60R 11/0241 455/347 |
| 2008/0031606 | A1 * | 2/2008 | Zax | G03B 29/00 396/56 |
| 2010/0248655 | A1 * | 9/2010 | Yahagi | H01Q 1/243 455/90.3 |
| 2013/0005401 | A1 * | 1/2013 | Rosenhan | G06F 1/1626 455/557 |
| 2015/0065159 | A1 * | 3/2015 | Alpert | G01S 5/21 455/456.1 |
| 2015/0103651 | A1 * | 4/2015 | Kekki | H04W 28/0289 370/230 |

* cited by examiner

*Primary Examiner* — Creighton Smith
(74) *Attorney, Agent, or Firm* — Howard B. Rockman; Mercedes V. O'Connor

(57) ABSTRACT

The powered portable handle remote system wirelessly controls a mobile communications device's application using wireless technology. It serves as a remote for the mobile communications device and as a handle to stabilize and hold the mobile communications device while using the mobile communications device. The powered portable handle remote system is a 3 piece system including a mobile communications device case, a powered handle remote, and a detachable section. The case has a unique built-in feature allowing it to be attached to the powered handle remote and the detachable section. The powered handle remote functions as a remote control using a set of buttons or a joystick to wirelessly control the mobile communications device. The powered handle remote separates into 2 pieces revealing a detachable section, such as a tripod adaptor, used to attach the case to a camera tripod or to support the mobile communications device case in itself.

25 Claims, 4 Drawing Sheets

| Drawing Legend | | | |
|---|---|---|---|
| 1 | Smartphone Case | 9 | Slide Action Button |
| 2 | Sliding Attachment Shoe | 10 | Threaded Hole |
| 3 | Powered Handle Remote | 11 | Coin Cell Battery |
| 4 | Tripod Adapter | 12 | Molded Feet |
| 5 | Smartphone | 13 | Counter Balance Weight |
| 6 | Locking Mechanism | 14 | Lanyard Loop |
| 7 | Trigger | 15 | Rubber Grips |
| 8 | Buttons | 16 | Wrist Angle |

POWERED PORTABLE HANDLE REMOTE FOR SMARTPHONE

This application claims priority and is a continuation of non-provisional patent application Ser. No. 13/725,690, filed Dec. 21, 2012, to the extent allowed by law.

FIELD OF THE INVENTION

The present invention relates to a system used for controlling a mobile communications device's application using a powered remote handling using wireless technology. Specifically, the invention provides the user using a mobile communications device the ability to control various functions of the mobile communications device application without having to touch the mobile communications device screen.

BACKGROUND

Mobile devices are becoming more advanced every day. As technology converges, mobile communications devices are beginning to take the place of other hardware including cameras and gaming consoles. Because of this, more people are using their phones to capture photos/video and play games thus the need for an advanced mobile communications device handle was presented.

We are living in a digital age where everything is captured and recorded using our devices. The latest mobile communications devices are now not only being used as cameras, but as camcorders as well. The convenience of always having a recording device close by has inspired more people to capture photos and video. Mobile communications devices by themselves deliver excellent video quality but because of their small size and shape they are awkward to hold and operate over time.

Playing a game on a mobile communications device can be awkward as well. To control the game functions, programmers use valuable screen space for software buttons. The more controls that are required to operate the game the less there is to display the scene or action of the game.

The powered portable handle remote system for mobile communications device solves this problem by providing a handle for the mobile communications device along with the functionality and ease of wirelessly controlling the mobile communications device applications without touching the screen.

SUMMARY OF THE INVENTION

The powered portable handle remote system is a 3 piece system that wirelessly controls the various features of the mobile communications device's application using buttons and/or a joystick. (See FIGS. 1, 2, and 7A-7D)

The first part of the system is the mobile communications device case (1). The mobile communications device case (1) varies from other phone cases due to the unique built-in sliding attachment shoe (2) used to secure mobile communications device case (1) to the powered handle remote (3) and the detachable section, such as a tripod adaptor (4). Any mobile communications device (5) can be used provided a mobile communications device case (1) is produced specific to the mobile communications device (5) make and model.

The second part of the system is the powered handle remote (3) which is designed for comfort and functionality. The top of the powered handle remote (3) contains a built-in locking mechanism (6) by which the mobile communications device case's sliding attachment shoe (2) is secured. The powered handle remote (3) utilizes a wrist angle (16) at the top so that the user's forearm and wrist will be parallel in use to reduce fatigue. A trigger (7) and a set of buttons (8) allow the user to control the various features of the mobile communications device's application. Additional buttons and/or a joystick (17), shown in FIGS. 7A-7D, can be added to the powered handle remote (3) to increase the amount of functions controlled on the mobile communications device's application. Elastomeric sides (15) add comfort and grip to the handle securing the powered handle remote (3) in the hand. A counter-balance weight (13) within the grip gives the entire system stability while in use.

The final part of the system is the detachable section, such as the tripod adaptor (4). The tripod adaptor (4) attaches to the bottom of the powered handle remote (3) and is released from the powered handle remote (3) when a slide action button (9) is activated. The separated tripod adaptor (4) can be used to connect the mobile communications device case (1) to a camera tripod using the threaded hole (10) on the underside or set down on a flat surface and used as a miniature tripod. The same slide action button (9) is also used to release a coin cell battery (11) from its holder once depleted. The locking mechanism (6) on the powered handle remote (3) can also be found on the tripod adaptor (4). Support structures, such as feet (12), on the underside of the tripod adaptor (4) prevent the system from rocking.

BRIEF DESCRIPTION OF THE DRAWINGS

Figure 1:
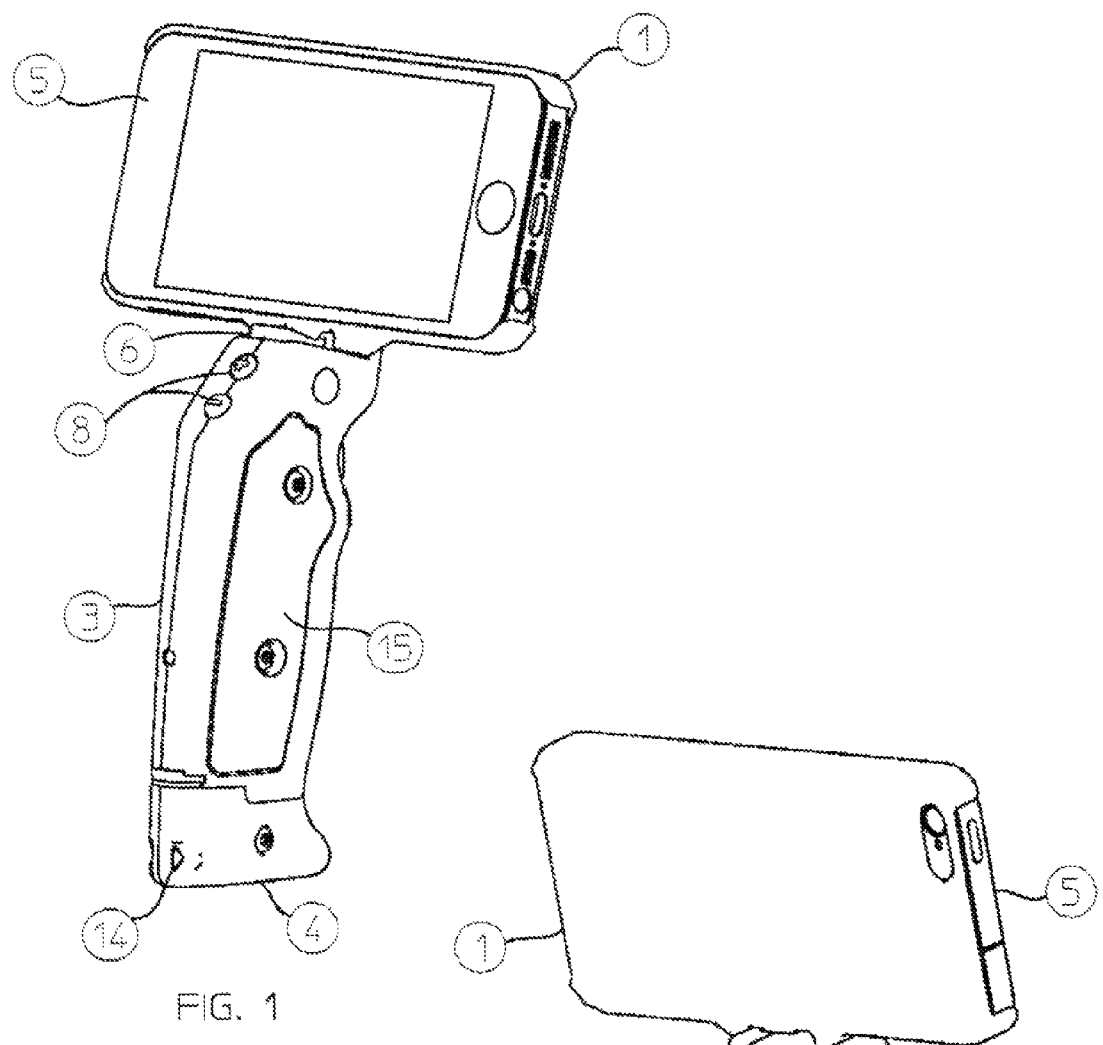

Having thus described the invention in general terms, reference will now be made to the included drawings, which are not necessarily drawn to scale, and wherein:

FIG. 1 shows a front isometric view of the powered portable handle remote system.

Figure 2:
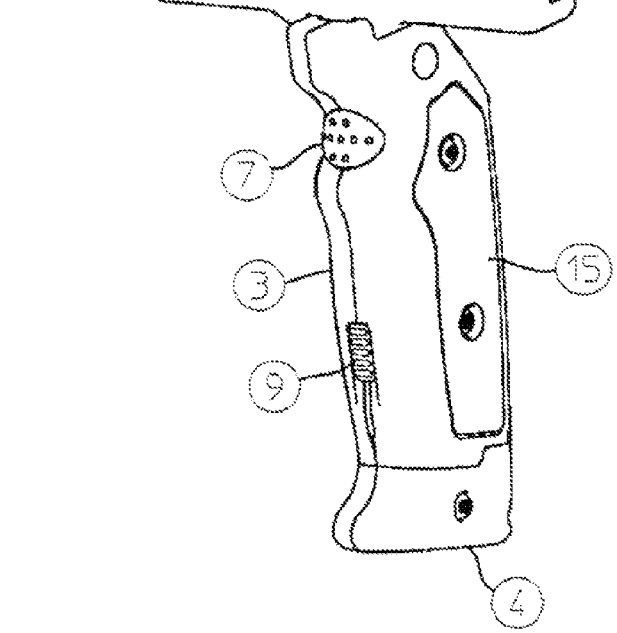

FIG. 2 shows a rear isometric view of the powered portable handle remote system.

Figure 3:
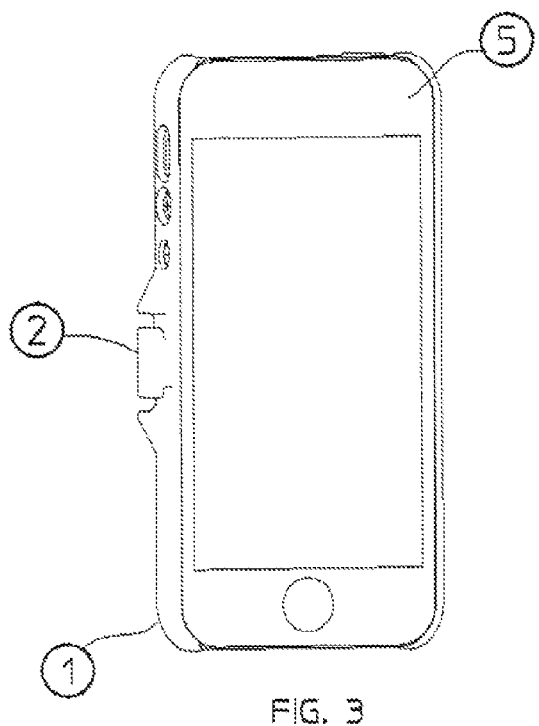

FIG. 3 shows the mobile communications device case detached from the powered portable handle remote system.

Figure 4:
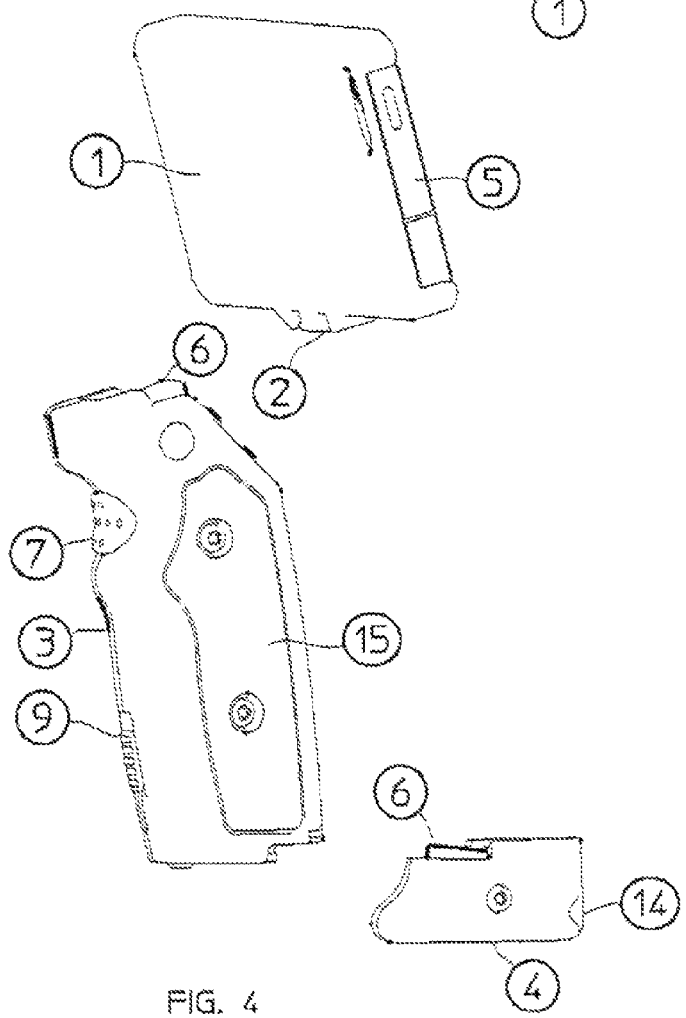

FIG. 4 shows the mobile communications device case and tripod adaptor being unlocked and removed from the powered handle remote.

Figure 5:
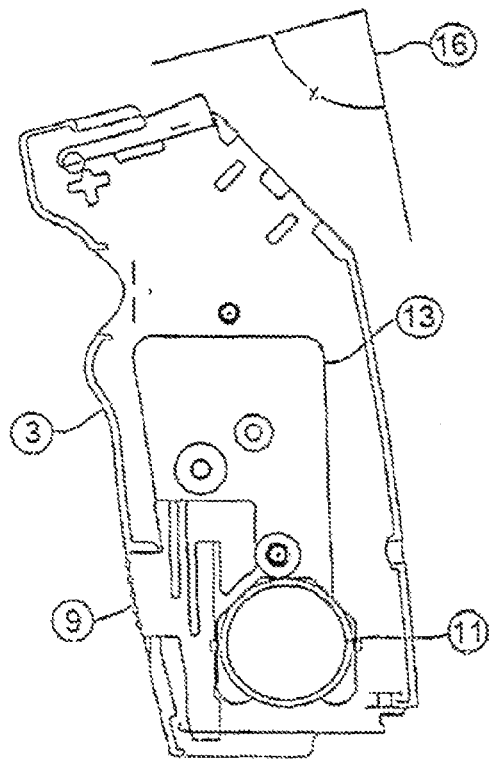

FIG. 5 shows a section view of the powered handle remote.

Figure 6:
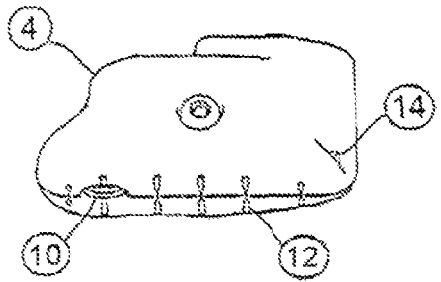

FIG. 6 shows a front underside isometric view of the tripod adaptor.

Figure 7A:
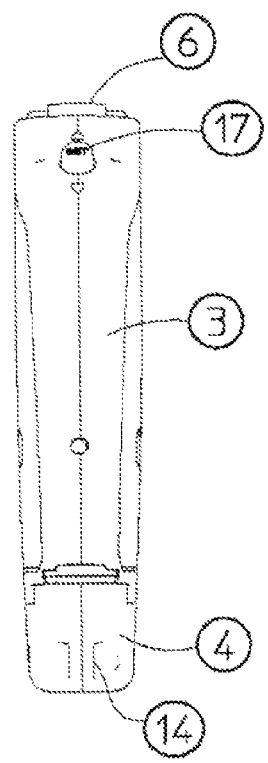

FIG. 7A shows a front plan view of the powered portable handle remote system including a joystick.

Figure 7B:
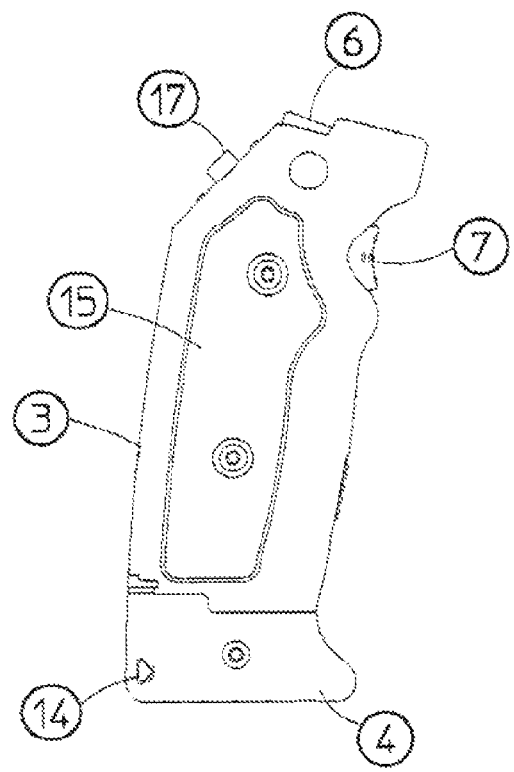

FIG. 7B shows a side plan view of the powered handle remote system including a joystick.

Figure 7C:
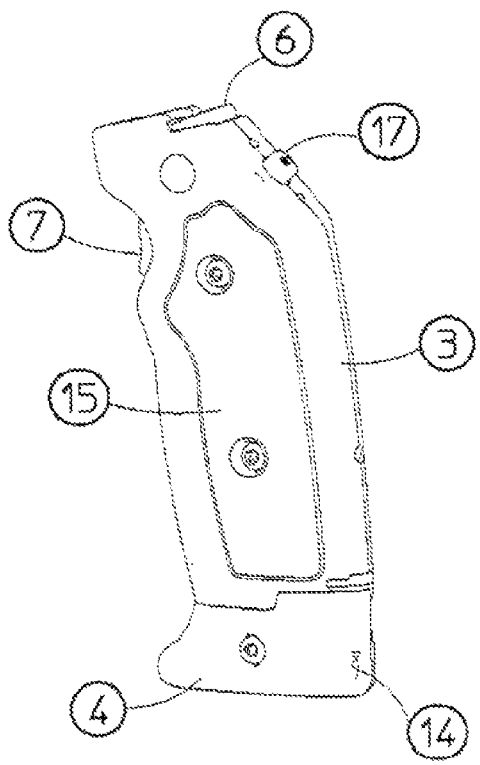

FIG. 7C shows a side perspective view of the powered handle remote system including a joystick.

Figure 7D:
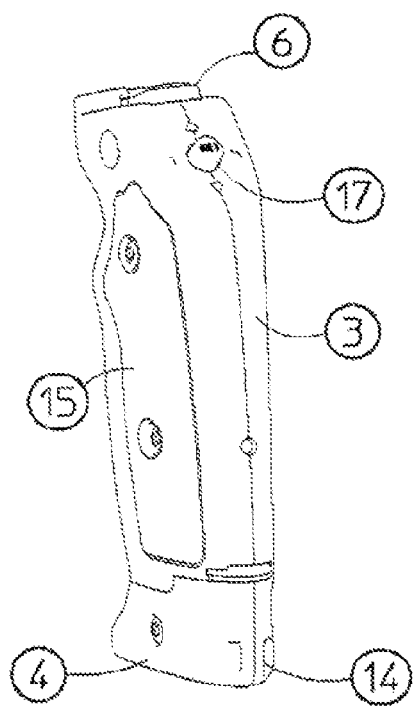

FIG. 7D shows a perspective view of the powered handle remote system including a joystick.

The invention claimed is:

1. A system to wirelessly control an application on a mobile communications device, the system comprising:
    a powered handle remote;
    a mobile communications device case removably attached to the powered handle remote;
    a detachable section removably connected to the powered handle remote, said detachable section adapted to support and stabilize the-mobile communications device case at a distance;
    an application software installed on the mobile communications device adapted to
    wirelessly communicate with the powered handle remote and interface with the mobile communications device's application; and said powered handle remote including at least one of a trigger, at least one button, and a joystick, said at least one of the trigger, at least one button and joystick adapted to wirelessly actuate a function of the mobile communications device through the application software.

2. The system of claim 1, wherein the mobile communications device case includes a sliding attachment shoe adapted to secure the mobile communications device to at least one of the powered handle remote and the detachable section.

3. The system of claim 1, wherein the powered handle remote is removably attached to the detachable section.

4. The system of claim 2, wherein:
the powered handle remote is removably attached to the detachable section; and
the mobile communications device case is removably attached to the powered handle remote and detachable section via a male connector and female receptacle, adapted to prevent rocking, twisting, and bending when said male connector and female receptacle are engaged.

5. The system of claim 4, wherein a first side and a second side of the male connector includes an inclined plane adapted to prevent the male connector from hooking or snagging on unwanted surfaces.

6. The system of claim 1, wherein:
the powered handle remote includes a detachable section adapted to support and stabilize the case attached to the mobile communications device at a distance; and
said detachable section adapted to seamlessly connect to the powered handle remote.

7. The system of claim 1, wherein:
the powered handle remote includes a detachable section adapted to support and stabilize the case attached to the mobile communications device at a distance; and
the powered handle remote includes a release mechanism adapted to separate the powered handle remote from the detachable section.

8. The system of claim 1, wherein the powered handle remote includes a release mechanism adapted to remove a battery from the powered handle remote.

9. The system of claim 1, wherein the powered handle remote includes an angled handle design adapted to allow a user to keep their wrist parallel to their forearm when the system is in use.

10. The system of claim 1, wherein the power handle remote includes an aperture near a bottom side of the system, said aperture adapted to allow a user to attach one of a lanyard and a strap.

11. The system of claim 1, wherein the powered handle remote includes a counter-balance weight within the powered handle remote, said counter-balance weight adapted to provide stability when the system is in use.

12. The system of claim 1, wherein the detachable section includes a plurality of support structures on a bottom side of the detachable section, said plurality of support structures adapted to provide anti-rocking when set on a flat surface.

13. The system of claim 1, wherein the application software uses bluetooth wireless technology to wirelessly communicate with the powered handle remote.

14. The system of claim 1, wherein the application software uses infrared to wirelessly communicate with the powered handle remote.

15. The system of claim 1, wherein the application software uses radio frequency to wirelessly communicate with the powered handle remote.

16. The system of claim 1, wherein the application software uses near field communication to wirelessly communicate with the powered handle remote.

17. The system of claim 1, wherein the wireless communication has a range sufficient to communicate with the mobile communications device so as to be able to control the mobile communication device's application from a distance.

18. The system of claim 1, wherein:
the powered handle remote includes a detachable section adapted to support and stabilize the case attached to the mobile communications device at a distance; and
the powered handle remote controls the mobile communications device's application when using the detachable section to stand and stabilize the at least one of the mobile communications device and case at a remote distance.

19. The system of claim 1, wherein the powered handle remote includes at least one over-molded elastomeric side adapted to provide grip, comfort, and impact resistance when the powered handle remote is in use or stored.

20. The system of claim 1, further comprising a case removably attached to the mobile communications device; and
a metallic insert attached to the case, said metallic insert adapted to stabilize the mobile communications device and case when attached to the powered handle remote.

21. The system of claim 1, wherein the detachable section includes a tripod adaptor.

22. The system of claim 2, wherein the powered handle remote includes a locking mechanism adapted to secure the powered handle remote to the sliding attachment shoe.

23. The system of claim 1, wherein the detachable section includes a threaded aperture adapted attach the detachable section to a tripod.

24. The system of claim 1, wherein the detachable section includes a locking mechanism adapted to secure the detachable section to the powered handle remote.

25. A system to wirelessly control an application on a mobile communications device, the system comprising:
a powered handle remote;
a mobile communications device support structure removably attached to the mobile communications device;
a support section connected to at least one of the mobile communications device support structure and the powered handle remote, said support section adapted to support and stabilize the-mobile communications device case at a distance;
an application software installed on the mobile communications device adapted to wirelessly communicate with the powered handle remote and interface with the mobile communications device's application; and
said powered handle remote including at least one of a trigger, at least one button, and a joystick, said at least one of the trigger, at least one button and joystick adapted to wirelessly actuate a function of the mobile communications device through the application software.

* * * * *

UNITED STATES PATENT AND TRADEMARK OFFICE
CERTIFICATE OF CORRECTION

PATENT NO. : 9,203,946 B2  
APPLICATION NO. : 14/793862  
DATED : December 1, 2015  
INVENTOR(S) : Robert Benedict Zajeski and Ben Lynch Zajeski Page 1 of 1

It is certified that error appears in the above-identified patent and that said Letters Patent is hereby corrected as shown below:

Title Page, Item (54) and in the Specification at Column 1, lines 1 and 2

In the title, "POWERED PORTABLE HANDLE REMOTE FOR SMARTPHONE" should be
--POWERED PORTABLE HANDLE REMOTE SYSTEM FOR MOBILE COMMUNICATIONS DEVICE--.

Signed and Sealed this
Eighth Day of March, 2016

Michelle K. Lee
*Director of the United States Patent and Trademark Office*